US012661306B2

(12) United States Patent
Brinz et al.

(10) Patent No.: US 12,661,306 B2
(45) Date of Patent: Jun. 23, 2026

(54) PHARMACEUTICAL PRODUCTION FACILITY COMPRISING A MEASURING DEVICE

(71) Applicant: Syntegon Technology GmbH, Waiblingen (DE)

(72) Inventors: Thomas Brinz, Bissingen an der Teck (DE); Philipp Stirm, Fellbach (DE); Stephanie Schütz, Mainhardt (DE)

(73) Assignee: Syntegon Technology GmbH, Waiblingen (DE)

( * ) Notice: Subject to any disclaimer, the term of this patent is extended or adjusted under 35 U.S.C. 154(b) by 286 days.

(21) Appl. No.: 18/710,229

(22) PCT Filed: Oct. 13, 2022

(86) PCT No.: PCT/EP2022/078499
§ 371 (c)(1),
(2) Date: May 15, 2024

(87) PCT Pub. No.: WO2023/104375
PCT Pub. Date: Jun. 15, 2023

(65) Prior Publication Data
US 2025/0268796 A1 Aug. 28, 2025

(30) Foreign Application Priority Data
Dec. 8, 2021 (DE) ..................... 10 2021 132 328.2

(51) Int. Cl.
*G01N 25/72* (2006.01)
*A61J 3/07* (2006.01)

(52) U.S. Cl.
CPC .............. *A61J 3/072* (2013.01); *G01N 25/72* (2013.01); *A61J 2200/72* (2013.01)

(58) Field of Classification Search
CPC ........ A61J 3/072; A61J 2200/72; G01N 25/72
(Continued)

(56) References Cited

U.S. PATENT DOCUMENTS 4,756,902 A * 7/1988 Harvey ................... A61J 3/072
53/485
4,991,377 A 2/1991 Marchesini
(Continued)

FOREIGN PATENT DOCUMENTS

JP 2008224464 A * 9/2008
WO 2002069897 A2 9/2002
WO 2004004628 A 1/2004

OTHER PUBLICATIONS

International Search Report and Written Opinion for Application No. PCT/EP2022/078499 dated Feb. 17, 2023 (18 pages including English machine translation).
(Continued)

*Primary Examiner* — Peter J Macchiarolo
*Assistant Examiner* — Mireille S Sadate-Moualeu
(74) *Attorney, Agent, or Firm* — Michael Best & Friedrich LLP

(57) ABSTRACT

The invention relates to a pharmaceutical production facility (10) comprising a measuring device (30, 32) for monitoring a seal of capsules (20). The capsules have a capsule shell which is made of a first shell part and a second shell part, said shell parts being provided with a sealing liquid in a sealing region, wherein the measuring device comprises an infrared camera (34) or a camera with an infrared filter, and the measuring device detects the temperature or a change in the temperature of the sealing region and/or capsule sections adjoining the sealing region.

13 Claims, 3 Drawing Sheets

(58) Field of Classification Search
  USPC ............................................................ 374/4
  See application file for complete search history.

(56)                    References Cited

U.S. PATENT DOCUMENTS

| 2004/0172169 A1* | 9/2004 | Wright, IV | .......... A61K 9/5078 |
| | | | 700/265 |
| 2005/0217207 A1* | 10/2005 | Konishi | .................. A61J 3/074 |
| | | | 53/53 |
| 2012/0041778 A1* | 2/2012 | Kraft | ........................ A61J 3/074 |
| | | | 215/250 |
| 2012/0229147 A1* | 9/2012 | Herrmann | .............. G01N 33/15 |
| | | | 324/637 |
| 2012/0241617 A1* | 9/2012 | Gertitschke | ........ G01N 21/9508 |
| | | | 250/338.1 |
| 2019/0152663 A1 | 5/2019 | Kraft | |

OTHER PUBLICATIONS

German Patent Office Examination Report for Application No. 102021132328.2 dated Aug. 16, 2022 (8 pages including English machine translation).
Japanese Patent Office Action for Application No. 2024534424 dated Mar. 25, 2025 (11 pages including English machine translation).

* cited by examiner

PHARMACEUTICAL PRODUCTION FACILITY COMPRISING A MEASURING DEVICE

BACKGROUND

The invention relates to a pharmaceutical production facility comprising a measuring device for monitoring sealing of capsules, wherein the capsules have a capsule shell, which is formed by a first shell part and a second shell part, wherein the shell parts are provided in a seal area with a leak-tight sealing liquid.

For example, a capsule filling and sealing device is known from US 2005/0217207 A1. This device has a filling unit for filling open shell parts of the capsules and a sealing unit for sealing two shell parts of the capsules to be connected to one another. Capsule parts to be filled or capsules to be provided with a seal pass through the above-mentioned units. The sealing unit has a line sensor camera for checking a seal status of the connection sections of the sealed capsules, connected to the purpose of sorting out capsules having flawed seals.

The device known from US 2005/0217207 A1 enables a two-dimensional depiction of a capsule to be created by means of a line sensor camera and a seal status of the capsule to be checked on the basis of such a depiction. The line sensor camera is suitable for banding, which significantly differs in color from adjacent capsule sections.

SUMMARY

Proceeding therefrom, the present invention is based on the object of enabling more flexible detection of a seal status.

This object is achieved in a pharmaceutical production facility of the type mentioned at the outset in that the measuring device comprises an infrared camera or a camera having an infrared filter, wherein the measuring device detects a temperature or a temperature range of the sealing area and/or of capsule sections adjacent to the sealing area.

An infrared camera or camera having an infrared filter enables the detection of infrared radiation and a visual detection of a temperature of at least one partial area of a capsule.

It has been recognized according to the invention that application and drying of a sealing liquid are accompanied by temperature changes, which are characteristic for different sealing states of a capsule. An application of still free-flowing and warm sealing liquid is initially accompanied, for example, by an introduction of heat into the sealing area. Such an introduction of heat can be detected by the infrared camera or the camera having an infrared filter.

During subsequent drying of the sealing liquid, the solvent of the sealing liquid evaporates, by which heat is withdrawn from the sealing liquid. Such a discharge of heat is detectable by the infrared camera or the camera having an infrared filter, for example by detecting cooling of a capsule section and/or by detecting a changed ambient temperature of the capsule.

The production facility according to the invention enables simple and reliable detection of a sealing status of a capsule and a drying status of a sealing liquid, without a color distinguishability of the sealing liquid and adjoining capsule sections being required for this purpose. Furthermore, it is possible in the course of a visual temperature detection to determine a position, orientation, and spatial extension of a sealing liquid.

The sealing liquid in particular consists of the same material as the capsule, for example, of gelatin. The sealing liquid can be a banding liquid (in this case the seal has a banding or is formed by a banding).

In an advantageous embodiment, the pharmaceutical production facility comprises an evaluation unit, wherein the evaluation unit is designed to automatically evaluate the temperatures and/or temperature changes detected by the measuring device. This enables at least substantially automated checking of the capsules with regard to a desired sealing status. For example, capsules having a defective seal can be identified and ideally sorted out automatically.

Furthermore, it is advantageous if the pharmaceutical production facility comprises a sealing device for sealing the capsules and a control unit, which specifies method parameters in particular on the duration and/or amount and/or position of the application of the sealing liquid to a capsule.

In an advantageous embodiment, the sealing device is designed to apply a sealing liquid over a sealing area of the capsule shell, for example, in a state in which the first shell part and the second shell part are already joined with one another. In this way, a tight seal in the form of a banding can be produced.

In an additional or alternative embodiment, the sealing device is designed to apply a sealing liquid to a sealing area of an inner or outer surface of a shell part not yet joined with another shell part, wherein the shell parts are joined with one another after application of the sealing liquid.

The control unit enables the application of a sealing liquid to be optimized in consideration of the type of sealing and the material properties of the capsule and the sealing liquid.

The pharmaceutical production facility preferably comprises a sealing device, a control unit, and a measuring device. This enables the production and checking of a capsule seal using a compact production unit.

The pharmaceutical production facility preferably comprises a filling device. Capsule shells can be filled with powdered or liquid active ingredients in this way and then sealed in the or a sealing device, wherein the measuring device enables a final check of the sealing status.

It is particularly preferred for the control unit to communicate with the evaluation unit. The temperature status of a sealing area of a capsule shell is detected by the measuring device and an infrared image is created. This infrared image is evaluated by the evaluation unit. The evaluation unit preferably carries out a comparison of detected actual values to target values stored in the evaluation unit. The evaluation unit can specify changed values for method parameters to the control unit as a function of such a comparison.

In a further preferred embodiment, the measuring device is arranged above the sealing device with respect to the direction of gravity. This enables monitoring of a sealing status already during the application of a sealing liquid or chronologically and spatially directly following the production of a seal, and without claiming an additional placement surface.

The pharmaceutical production facility preferably comprises a drying line, along which the capsules are transported during drying of the sealing liquid. For example, it is possible that multiple capsules are arranged distributed along the drying line, wherein the degree of drying of the capsules increases viewed along the drying line and in the transport direction of the capsules.

In particular, a plurality of measuring devices arranged spatially offset to one another is provided, wherein the measuring devices each have an infrared camera or a camera having an infrared filter. For example, a first measuring device is arranged above a sealing device with respect to the direction of gravity. A second measuring device is arranged, for example, in an area adjacent to the sealing device. If the pharmaceutical production facility comprises a drying line, a first measuring device can be provided which is spatially assigned to the sealing device and monitors the application of a sealing liquid, and a second measuring device which is spatially assigned to the drying line and monitors the drying process. The use of third and further measuring devices is also possible.

The object mentioned at the outset is also achieved by a method having the features of the independent method claim. Embodiments and advantages of the method according to the invention were already explained above with reference to the production facility according to the invention.

BRIEF DESCRIPTION OF THE DRAWINGS

Further features and advantages of the invention are the subject matter of the following description and the illustration in the drawings of exemplary embodiments.

In the figures of the drawings

DETAILED DESCRIPTION

Figure 1:
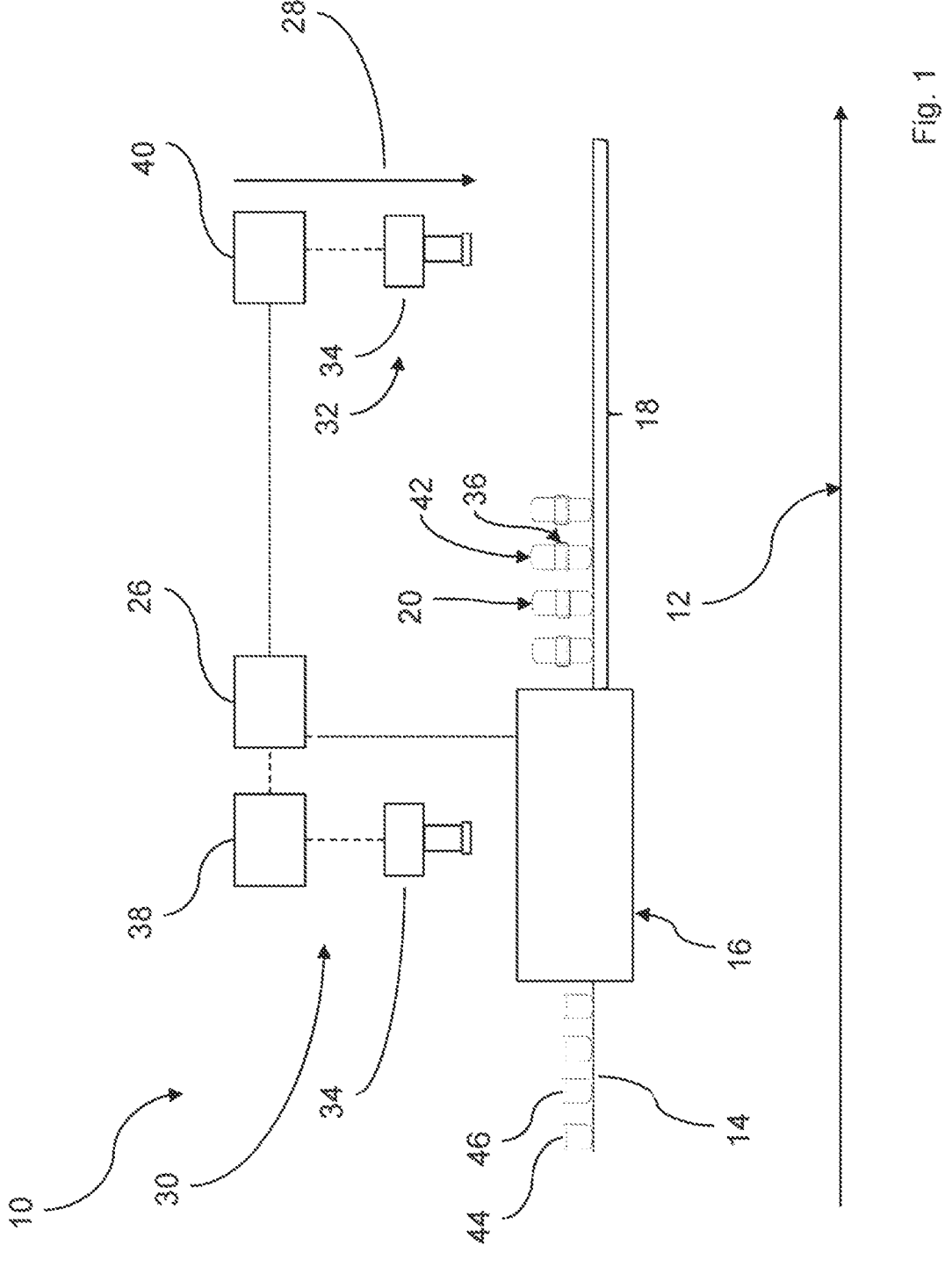
FIG. 1 shows a side view of an embodiment of a pharmaceutical production facility having two measuring devices.

FIG. 1 schematically shows an embodiment of a pharmaceutical production facility, which is designated as a whole by the reference sign 10. The pharmaceutical production facility 10 is assigned a production direction 12, along which processing and machining of capsule parts or capsules takes place. The pharmaceutical production facility 10 comprises, viewed along the production direction 12, a transport belt 14, a sealing device 16, and a drying line 18.

The transport belt 14 is used to arrange and to transport shell parts 44 and 46 along the production direction 12 into the sealing device 16.

Figure 3:
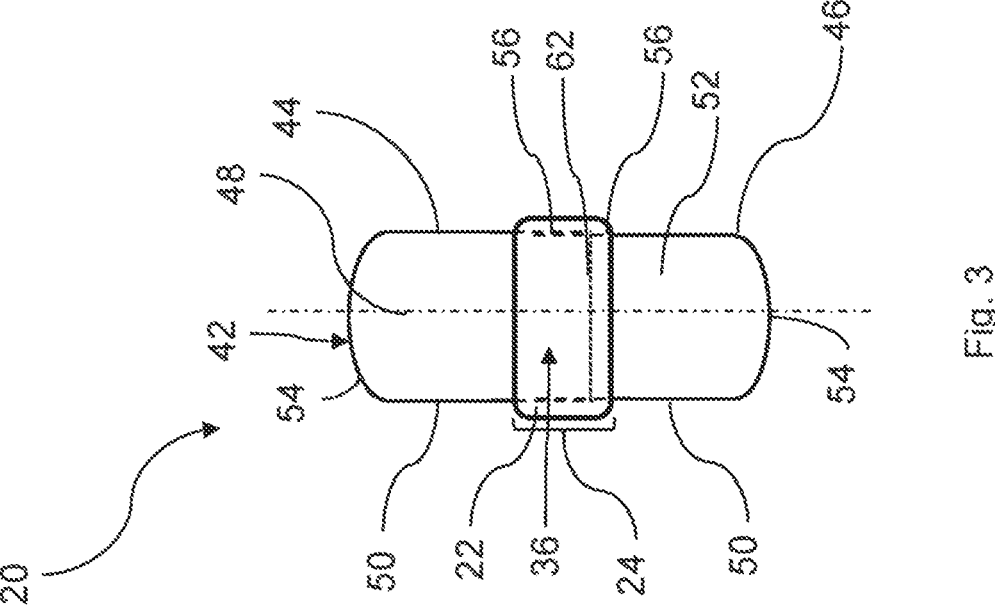
FIG. 3 shows a top view of a further embodiment of a capsule.
Figure 2:
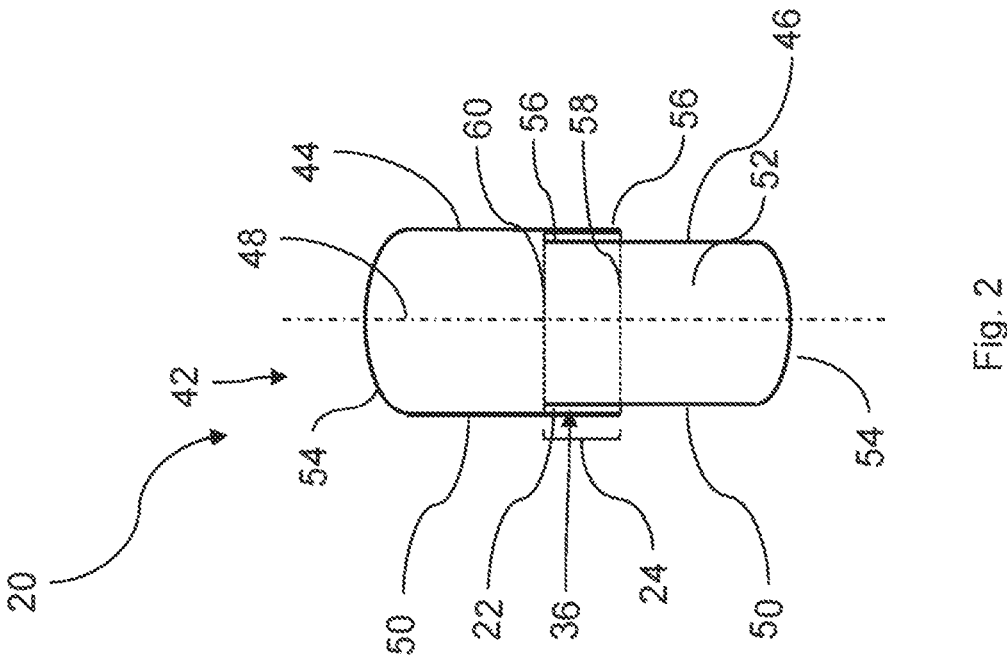
FIG. 2 shows a top view of a first embodiment of a capsule.

In the sealing device 16, the shell parts 44 and 46 are sealed leak-tight in a sealing area 24 by means of a sealing liquid 22 to produce capsules 20 (cf. FIGS. 2 and 3).

The sealing device 16 communicates with a control unit 26, which specifies method parameters for the duration and/or amount and/or position of the application of the sealing liquid 22 to a capsule 20. For example, the sealing device 16 can be electrically connected to the control unit 26, or they communicate wirelessly with one another.

After application of the sealing liquid 22, the sealed capsules 20 reach the drying line 18, along which the capsules 20 are transported following the production direction 12 and along which the sealing liquid 22 respectively applied to a capsule 20 dries.

The production facility 10 has, for example, two measuring devices 30 and 32. A first measuring device 30 is preferably arranged above the sealing device 16 with respect to a direction of gravity 28. A second measuring device 32 is, for example, arranged above the drying line 18 with respect to the direction of gravity 28, in particular in the area of an end of the drying line 18.

The measuring devices 30, 32 each comprise an infrared camera 34. The measuring devices 30, 32 detect temperatures and/or temperature changes of the capsules 20 by means of the infrared camera 34, in particular temperatures of the sealing areas 24 of the capsules 20.

Figure 4:
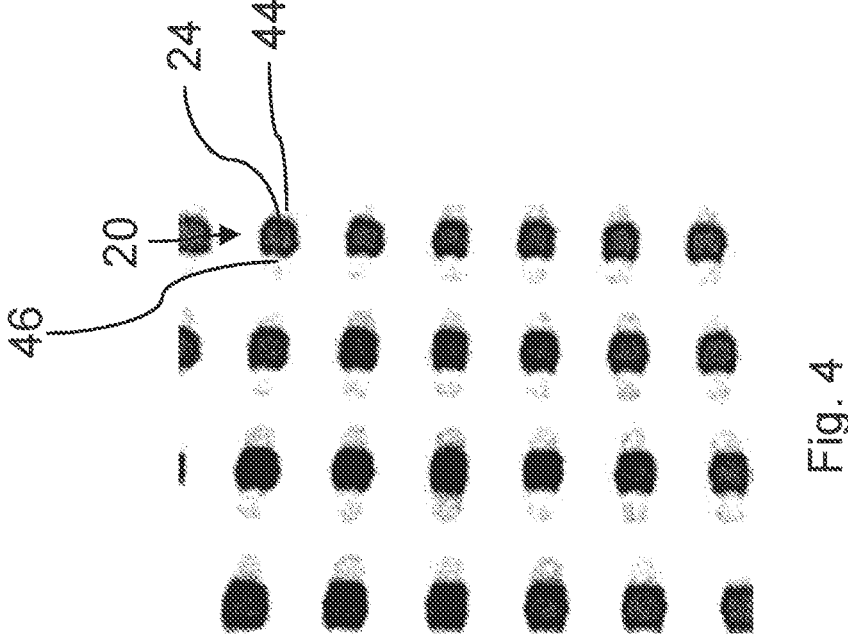
FIG. 4 shows a visual representation of a temperature status, detected by means of a first measuring device of the production facility according to FIG. 1, of a plurality of capsules and their seals.

The first measuring device 30 (assigned to the sealing device 16) detects temperature statuses of the respective sealing areas 24 of respective capsules 20 and/or of capsule sections adjacent to a respective sealing area 24, in particular of the ends of the shell parts 44 and 46 facing away from one another. FIG. 4 shows by way of example a visual representation of temperature statuses which are detected by the first measuring device 30. Directly following an application of the sealing liquid 22, the sealing area 24 of a capsule 20 has a significantly higher temperature in comparison to laterally adjoining capsule sections of the shell parts 44 and 46 of this capsule 20, which corresponds in FIG. 4 to a clear contrast between the mentioned areas of the capsules 20.

Figure 5:
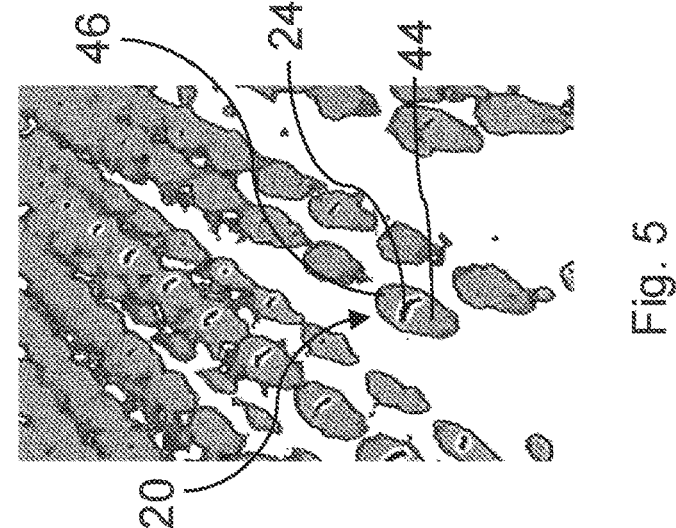
FIG. 5 shows a representation corresponding to FIG. 4 of a temperature status, detected by means of a second measuring device of the production facility according to FIG. 1, of the plurality of capsules and their seals.

The second measuring device 32 (assigned to an end of the drying line 18) also detects temperature statuses of the respective sealing areas 24 of respective capsules 20 and/or of capsule sections adjacent to a respective sealing area 24, in particular of the ends of the shell parts 44 and 46 facing away from one another. FIG. 5 shows by way of example a visual representation of temperature statuses which are detected by the second measuring device 32. After at least substantially completed drying (with evaporation of a solvent) of the sealing liquid 22 of a capsule 20, the sealing area 24 has a temperature which has substantially equalized to the temperature of the laterally adjoining capsule sections of the shell parts 44 and 46 of these capsules 20, which corresponds in FIG. 5 to a contrast between the mentioned areas of the capsules 20 which is only still weak.

The first measuring device 30 and the second measuring device 32 each communicate with a respective assigned evaluation unit 38, 40. Alternatively thereto, the pharmaceutical production facility 10 only comprises one common evaluation unit 38 or 40, which communicates both with the first measuring device 30 and with the second measuring device 32.

The at least one evaluation unit 38, 40 is designed to automatically evaluate the temperatures and/or temperature changes detected by the measuring device 30, 32.

The first measuring device 30 detects temperatures and/or temperature changes and, by spatial assignment of the temperatures, also the positioning, extension, and/or completeness of a sealing of a freshly produced sealing area 24 of a capsule 20.

The second measuring device 32 detects temperatures and/or temperature changes and, by spatial assignment of the temperatures, also the positioning, extension, and/or completeness of a sealing of an at least partially dried sealing area 24 of a capsule 20.

In an alternative embodiment (not shown in the drawings), no drying line 18 is provided. In this case, capsules 20—after application of a sealing liquid 22—remain in the sealing device 16 for the duration of a drying. A measuring device 30 assigned to the sealing device 16 in this case preferably detects both temperature statuses of freshly produced sealing areas 24 and partially dried or completely dried sealing areas 24.

The evaluation units 38, 40 communicate with the control unit 26. For example, the first and second evaluation unit 38, 40 can be electrically connected to the control unit 26 or can contactlessly communicate with one another. If one of the two evaluation units 38, 40 establishes a deviation of the actual values from specified target values of the position and/or completeness and/or drying of the sealing areas 24, the method parameters for the operation of the sealing device 16—for example a duration and/or an amount and/or a position of an application of the sealing liquid 22—are automatically adapted by means of the control unit 26.

The production facility 10 is suitable for use for capsules 20 which have different types of seals. This will be explained hereinafter with reference to FIGS. 3 and 4.

A capsule 20 has a capsule shell 42. The capsule shell 42 is formed from a first shell part 44 and a second shell part 46. Each shell part 44 and 46 has a wall 50 extending rotationally symmetrically around a common extension axis 48, which delimits a receptacle space 52, which is used to receive pharmaceutical active ingredients. A free end 54 of each shell part 44, 46 is closed, and a second end 56 has an opening 58, 60 facing toward the internal receptacle space 52 in each case. The diameter of the opening 58 of a first shell part 44 is larger than a diameter of the opening 60 of the second shell part 46, such that the second shell part 46 can be inserted with its opening 60 into the opening 58 of the first shell part 44 for the purpose of forming the capsule shell 42.

FIG. 2 shows an embodiment of a capsule 20 having a concealed seal 36. Before the first shell part 44 and the second shell part 46 are plugged together, sealing liquid 22 is applied in an area which is delimited on the radial outside by the second end 56 of the first shell part 44 and on the radial inside by the second end 56 of the second shell part 46.

FIG. 3 shows an embodiment of a capsule 20 having an externally exposed seal 36. The first and second shell part 44, 46 are plugged together—as in the embodiment according to FIG. 2. A sealing area 24 is arranged on the radial outside with respect to the walls 50 and is exposed to the surroundings of the capsule 20. Such a sealing area 24 is also referred to as a banding.

The invention claimed is:

1. A pharmaceutical production facility (10) having a measuring device (30, 32) for monitoring sealing of capsules (20), wherein the capsules (20) have a capsule shell (42), which is formed by a first shell part (44) and a second shell part (46), wherein the shell parts (44, 46) are provided in a sealing area (24) with a sealing liquid (22), wherein the measuring device (10) comprises an infrared camera (34) or a camera having an infrared filter, wherein the measuring device (30, 32) detects a temperature or a temperature change of the sealing area (24) and/or of capsule sections adjacent to the sealing area (24).

2. The pharmaceutical production facility (10) as claimed in claim 1, wherein the pharmaceutical production facility (10) comprises an evaluation unit (38, 40), wherein the evaluation unit (38, 40) is configured to automatically evaluate the temperatures and/or temperature changes detected by the measuring device (30, 32).

3. The pharmaceutical production facility (10) as claimed in claim 2, wherein the pharmaceutical production facility (10) comprises a sealing device (16) for sealing the capsules (20) and a control unit (26), which specifies method parameters for a duration and/or amount and/or position of application of the sealing liquid (22) to a capsule (20).

4. The pharmaceutical production facility (10) as claimed in claim 3, wherein the control unit (26) communicates with the evaluation unit (38, 40).

5. The pharmaceutical production facility (10) as claimed in claim 4, wherein the measuring device (30) is arranged above the sealing device (16) with respect to a direction of gravity (28).

6. The pharmaceutical production facility (10) as claimed in claim 3, wherein the measuring device (30) is arranged above the sealing device (16) with respect to a direction of gravity (28).

7. The pharmaceutical production facility (10) as claimed in claim 1, wherein the pharmaceutical production facility (10) comprises a drying line (18), along which the capsules (20) are transported during drying of the sealing liquid (22).

8. The pharmaceutical production facility (10) as claimed in claim 1, wherein a plurality of measuring devices (30, 32) arranged spatially offset in relation to one another is provided, wherein the measuring devices (30, 32) each have an infrared camera (34) or a camera having an infrared filter.

9. The pharmaceutical production facility (10) as claimed in claim 1, wherein the pharmaceutical production facility (10) comprises a sealing device (16) for sealing the capsules (20) and a control unit (26), which specifies method parameters for a duration and/or amount and/or position of application of the sealing liquid (22) to a capsule (20).

10. A method for monitoring sealing of capsules (20), wherein the capsules (20) have a capsule shell (42), which is formed by a first shell part (44) and a second shell part (46), wherein the shell parts (44, 46) will be provided or are provided in a sealing area (24) with a sealing liquid (22), the method comprising:

a) detecting a temperature or a temperature change of the sealing area (24) and/or of capsule sections adjacent to the sealing area (24), and b) evaluating the temperature or the temperature change.

11. The method as claimed in claim 10, wherein a detection according to step a) takes place during an application of sealing liquid (22) in the sealing area (24) and/or after the application of sealing liquid (22) in the sealing area (24).

12. The method as claimed in claim 10, wherein method parameters on a duration and/or amount and/or position of application of the sealing liquid (22) to a capsule (20) are adapted as a function of the temperature or temperature change detected according to step a).

13. The method as claimed in claim 11, wherein method parameters on a duration and/or amount and/or position of application of the sealing liquid (22) to a capsule (20) are adapted as a function of the temperature or temperature change detected according to step a).

* * * * *